INVENTOR.
D. M. LITTLE
G. R. HETTICK

INVENTOR.
D.M. LITTLE
G.R. HETTICK
BY
*Young & Quigg*
ATTORNEYS

United States Patent Office 3,448,040
Patented June 3, 1969

3,448,040
ADDUCT TYPE HYDROCARBON SEPARATION WITHOUT FILTRATION WITH A SULFOLANE SOLVENT
Donald M. Little and George R. Hettick, Bartlesville, Okla., assignors to Phillips Petroleum Company, a corporation of Delaware
Continuation-in-part of application Ser. No. 573,680, Aug. 19, 1966. This application Oct. 13, 1967, Ser. No. 675,203
Int. Cl. C10g 43/20, 43/18, 43/02
U.S. Cl. 208—308          17 Claims

ABSTRACT OF THE DISCLOSURE

An amide capable of selectively forming a crystalline hydrocarbon adduct, a sulfolane compound, and a mixed hydrocarbon feed are added to a reaction vessel. These reactants stratify into an unreacted hydrocarbon phase, an intermediate phase, and a sulfolane phase containing the adduct crystals. The unreactive hydrocarbon phase is withdrawn as a product; the sulfolane phase containing adduct crystals is withdrawn and heated to decompose the adduct, the amide thus recovered dissolving in the hot sulfolane and the reactive hydrocarbon forming a separate phase which is decanted to form the reactive hydrocarbon product.

CROSS-REFERENCES TO RELATED APPLICATION

This is a continuation-in-part of application Ser. No. 573,680, filed Aug. 19, 1966, now abandoned.

BACKGROUND OF THE INVENTION

This invention relates to a method of, and apparatus for, the separation of hydrocarbons by the formation and subsequent decomposition of amide-hydrocarbon adducts in the presence of a sulfolane compound, without the use of a filtering or centrifuge step to separate the adduct crystals.

It has long been known to the prior art that urea or thiourea will react with certain adduct-forming compounds to form adducts. Thus, for example, it is known that urea will selectively react with straight chain hydrocarbon compounds having at least 6 carbon atoms per molecule to form a crystalline adduct, but will not react with branched chain hydrocarbon compounds. Further it is known that thiourea will selectively react with branched chain hydrocarbon compounds to form a crystalline adduct but will not react with straight chain hydrocarbon compounds.

Generally, according to the prior art, the adduct is separated from the reaction mixture by filtration or centrifuging. It is then heated to decompose the adduct to release the hydrocarbon. French Patent 963,979, for instance, discloses forming such complexes which are separated from the liquid materials by filtering and U.S. 2,911,350, Nov. 3, 1959, discloses either filtering or centrifuging to separate the adduct crystals from the nonreactive components and any diluent which may be present.

Water has been used in the prior art (e.g., U.S. 2,938,022) to dissolve amides such as urea before their addition to the reaction vessel. However, water has an undesirable tendency to form an emulsion with the hydrocarbon, particularly with hydrocarbons boiling above about the boiling point of gasoline. Also, while the prior art (e.g., U.S. 2,735,843) has disclosed dissolving the amide formed from the decomposition of the adduct in water, because of the great solubility of such compounds as urea in water there can be no control, when water is present, over whether the urea will be returned to the reaction vessel as a solution or in the form of discrete solid particles. Furthermore, any addition of water ultimately necessitates an extra step to dry the product.

While this hydrocarbon-adduct process for the separation of hydrocarbons has been known for many years, it has never achieved commercial success, at least partly because of the complexity of separating the adduct from the reaction mixture by either filtration or centrifuging.

SUMMARY OF THE INVENTION

It is an object of this invention to provide for the separation of a hydrocarbon-amide adduct from a reaction mixture without the use of a filtration or centrifuging step. A further object of this invention is to provide for a sulfolane compound phase in a reaction vessel into which hydrocarbon-amide adducts separate. A further object of this invention is to decompose a hydrocarbon-amide adduct in the presence of a sulfolane compound whereby the amide dissolves in the sulfolane compound as it is released thus eliminating the need for a filtration or centrifuging step. A still further object of this invention is to adjust the temperature of the sulfolane compound so that the amide may be returned to the reaction vessel as a solution or as a solid suspension as desired. Yet a further object of this invention is to separate straight chain, branched chain and aromatic hydrocarbons to yield products of high purity.

In accordance with this invention an amide capable of selectively forming a crystalline hydrocarbon adduct, a sulfolane compound, and a mixted hydrocarbon feed are added to a reaction vessel wherein a hydrocarbon-adduct is formed. These reactants stratify without any significant emulsion formation even when high boiling hydrocarbons are separated, thus allowing phase separation of the unreacted hydrocarbon product and the sulfolane component which contains the adduct crystals. On heating this sulfolane phase to decompose the adduct, the amide thus recovered dissolves in the hot sulfolane and the reactive hydrocarbon forms a separate phase, thus allowing the entire separation to take place without the use of costly filtration or centrifuging steps.

BRIEF DESCRIPTION OF THE DRAWINGS

In the drawings, forming a part hereof wherein like reference characters denote like parts in both views.

DESCRIPTION OF THE PREFERRED EMBODIMENTS

The term "sulfolane compound" refers to a compound of the following structural formula:

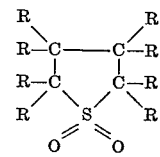

Each R can represent either a hydrogen atom or a hydrocarbon radical having from 1 to 6 carbon atoms per molecule. The preferred material is sulfolane, i.e., a sulfolane compound where each R in the above formula represents a hydrogen atom. Examples of substituted sulfolanes include 2-methyl sulfolane, 3-methyl sulfolane, 3-ethyl sulfolane, 2,4-dimethyl sulfolane, 2-butyl sulfolane, 2-isobutyl sulfolane, 2-butenyl sulfolane, 2-cyclopentyl sulfolane, and the like.

The hydrocarbon feed can contain normal and branched chain paraffins, normal and branched chain olefins, naphthenics (cycloparaffins), such as cyclohexane, and aromatics. These hydrocarbons can have from 6 to 50 carbon atoms per molecule, preferably from 7 to 24.

The reactor temperature and pressure can vary widely depending on the type of hydrocarbon being separated. Generally a temperature of 90–135° F. and a pressure of 5–100 p.s.i.g. will be used during the formation of the adduct.

The sulfolane compound recovery columns will generally be operated at a pressure of 0–15 p.s.i.a., and a temperature of 300–600° F. at the top and 500–600° F. at the bottom.

The decomposition and phase separation zone will generally be run at a pressure of from 5–20 p.s.i.g. and a temperature at from 180–240° F., the adducts normally breaking at around 160° F.

Figure 1:
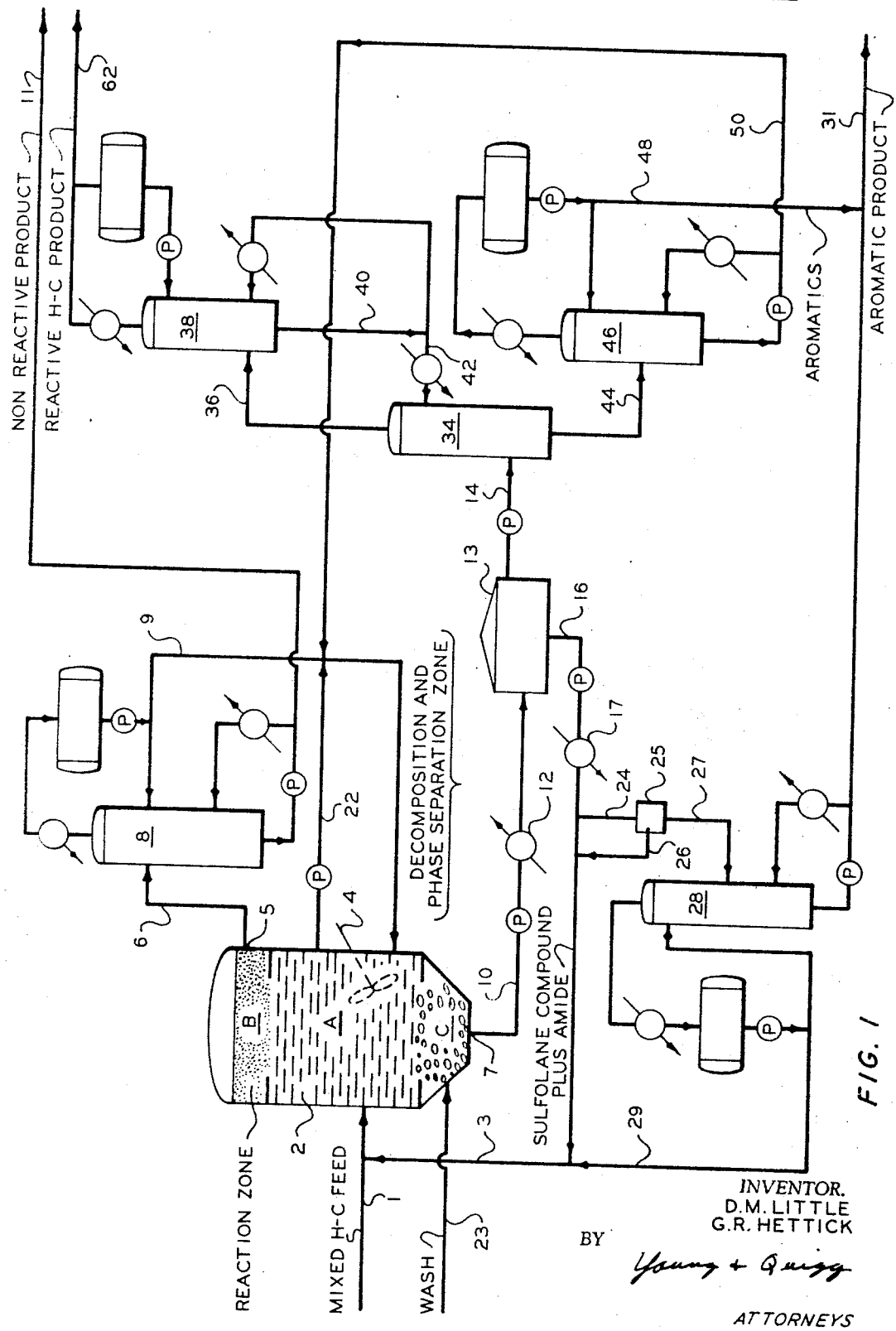
FIGURE 1 is a schematic representation of one embodiment of the invention.

Referring now to FIGURE 1, a stream of mixed branched chain and straight chain hydrocarbons (which can contain aromatics and naphthenes) is fed by a conduit 1 through a feed inlet to reaction vessel 2, which serves as the reaction zone. An amide capable of selectively forming adducts with either straight chain or branched chain hydrocarbons, carried by a sulfolane compound stream, is added to the feed via conduit 3. A stirrer 4, or other agitation means, may be present or the reaction vessel may be in the form of a columnar contactor in which case no stirrer is required.

The reactants stratify into an intermediate mixing zone A, a layer of unreacted hydrocarbons in the upper zone B, and a lower zone C which is comprised essentially of a slurry of hydrocarbon adduct crystals in the sulfolane compound. Because of the incompatibility of the hydrocarbons in zone B with the sulfolane compound, zone B is in the form of a separate phase. For instance in the case of a straight chain-branched chain hydrocarbon feed using urea, zone B is comprised of branched chain hydrocarbon; zone A during mixing is comprised of a mixture of straight chain and branched chain hydrocarbons (and cycloalkanes, if any were present in the feed, and aromatics dissolved in the sulfolane, if these are present in the feed), sulfolane compound, and adduct crystals; zone C is composed essentially of sulfolane compound plus straight chain hydrocarbon-urea adduct crystals. The unreacted hydrocarbons are drawn off from zone B via non-adduct-forming hydrocarbon compound outlet 5. The slurry of hydrocarbon adduct crystals in the sulfolane compound is withdrawn from zone C via adduct and sulfolane compound mixture outlet 7.

The material from zone B can be fed by conduit 6 to a first sulfolane compound recovery column 8 to separate the hydrocarbons from any sulfolane compound that may be present. Any sulfolane compound recovered is returned to the reaction vessel through conduit 9. The unreacted hydrocarbon product is delivered by conduit 11. For instance when using urea this product is essentially branched chain hydrocarbon. It is apparent that in the case of hydrocarbons which boil at a lower temperature than the sulfolane compound that the hydrocarbon would be taken off the overhead of this column and the sulfolane would be taken off the bottom.

The material from zone C is fed by conduit 10 through heating section 12 at which point the adduct is thermally decomposed and the products separated in decanter 13, the heating section and decanter thus forming a decomposition and phase separation zone or means. The released hydrocarbon, being insoluble in sulfolane forms an upper phase in decanter 13 which is withdrawn through conduit 14. The amide released on decomposition of the hydrocarbon adduct crystals dissolves in the sulfolane compound which forms the lower phase. This sulfolane compound amide solution is withdrawn via conduit 16 and passed through chilling section 17, and then back to the reaction vessel via conduit 3. Because of the particular solubility of the suitable amide compounds in the sulfolane compounds, chilling section 17 can be controlled to precipitate the amide from solution or merely to cool the solution down sufficiently to allow reaction with the hydrocarbon when the amide is reintroduced into the reaction chamber. Preferably the sulfolane is reintroduced into the reaction chamber at a temperature warm enough that the amide is in solution, the reaction chamber being held at a lower temperature such that the amide crystallizes out adducting reactive hydrocarbon as it crystallizes out. Preferably the reactor is agitated during this operation. In this way smaller amide crystals form and more efficient adduction of the reactive hydrocarbon is effected.

The product which is withdrawn from decanter 13 can be fed by conduit 14 to a sulfolane compound recovery system described hereinafter.

A wash of, for instance, a light hydrocarbon such as n-hexane can be introduced into the slurry of hydrocarbon adduct crystals via conduit 23 and comes off with the overhead product; it is then separated and reintroduced to the reaction vessel (via means not shown).

The sulfolane compound can be added to the reaction vessel in a separate stream from the amide.

Means can be provided for the separation of aromatic hydrocarbons from straight chain and branched chain hydrocarbons. Any aromatics in the feed will be dissolved in the sulfolane compound since sulfolane compounds selectively dissolve aromatic hydrocarbons to the exclusion of cycloparaffins and noncyclic hydrocarbons. A very small slip stream is pulled off the sulfolane compound plus amide return line 16, for instance at a point just below the chiller as is shown by conduit 24. Further chilling may be used (not shown). The amide crystals are filtered out by filter 25 and returned to line 3 via conduit 26. It must be emphasized that this filtration relates only to separating amide crystals from the sulfolane in instances where it is desired to separate aromatics in this manner; in no instance is filtration or centrifuging necessary to separate the adduct crystals from the reaction medium. Other separation means can be provided for separating the amide crystals from the sulfolane. The sulfolane filtrate containing dissolved aromatics is fed to fractionation column 28 via conduit 27. Sulfolane is taken off as overhead (when the hydrocarbon has the higher boiling point) and returned to line 3 via conduit 29. The aromatic product is recovered from line 31. Other separation means can be provided for separating the aromatics from the amide-sulfolane compound stream; for instance the aromatic can be separated by the addition of water. If this slip line for the separation of aromatics is not provided and aromatics are present, the sulfolane will simply become saturated with aromatics and essentially all further aromatics will be recovered with the nonreactive hydrocarbon product. Again, it is apparent that when dealing with lighter hydrocarbons the hydrocarbon would be taken off as overhead and the sulfolane as bottoms product.

When dealing with heavier hydrocarbons no significant problems are encountered as a result of the build up of aromatics in the sulfolane compound. With lighter hydrocarbons, however, there is some problem with aromatic contamination of the reactive product, thus making it desirable to extract the aromatics from the feed or from the product. The following alternate embodiments describe methods of achieving higher purity products.

The product from decanter 13, carried by conduit 14, comprising the reactive product, a small amount of entrained sulolane compound, and in some instances some aromatic compound, is introduced into first wash column 34. The reactive hydrocarbon product (in the illustration of this embodiment, the hydrocarbon stream has a boiling point below that of sulolane) is carried overhead by conduit 36 to second sulfolane recovery column 38. A portion of the sulfolane recovered as bottoms product (or overhead in the case of higher boiling hydrocarbons) is withdrawn from sulfolane recovery column 38 via conduit 40 and introduced after cooling via conduit 42 into said first wash column 34 as the source of sulfolane to extract any aromatic compounds which may be present in the reactive hydrocarbon product carried by line 14. The resulting aromatic rich sulfolane is withdrawn from column 34 via conduit 44 and introduced into aromatic stripper 46. Aromatics are withdrawn via conduit 48 and can be combined with aromatic product line 31. Sulfolane is recovered as bottoms product via conduit 50 (or if the aromatic product is high boiling then it is recovered as overhead and the sulfolane recovered as bottoms product) and introduced back into the reactor via conduit 9. The high purity reactive hydrocarbon product is recovered as overhead from column 38 (or bottoms product in the event the reactive hydrocarbon is high boiling) via conduit 62. Wash column 34 can be bypassed and the product from decanter 13 fed directly to the stripper column.

Figure 2:
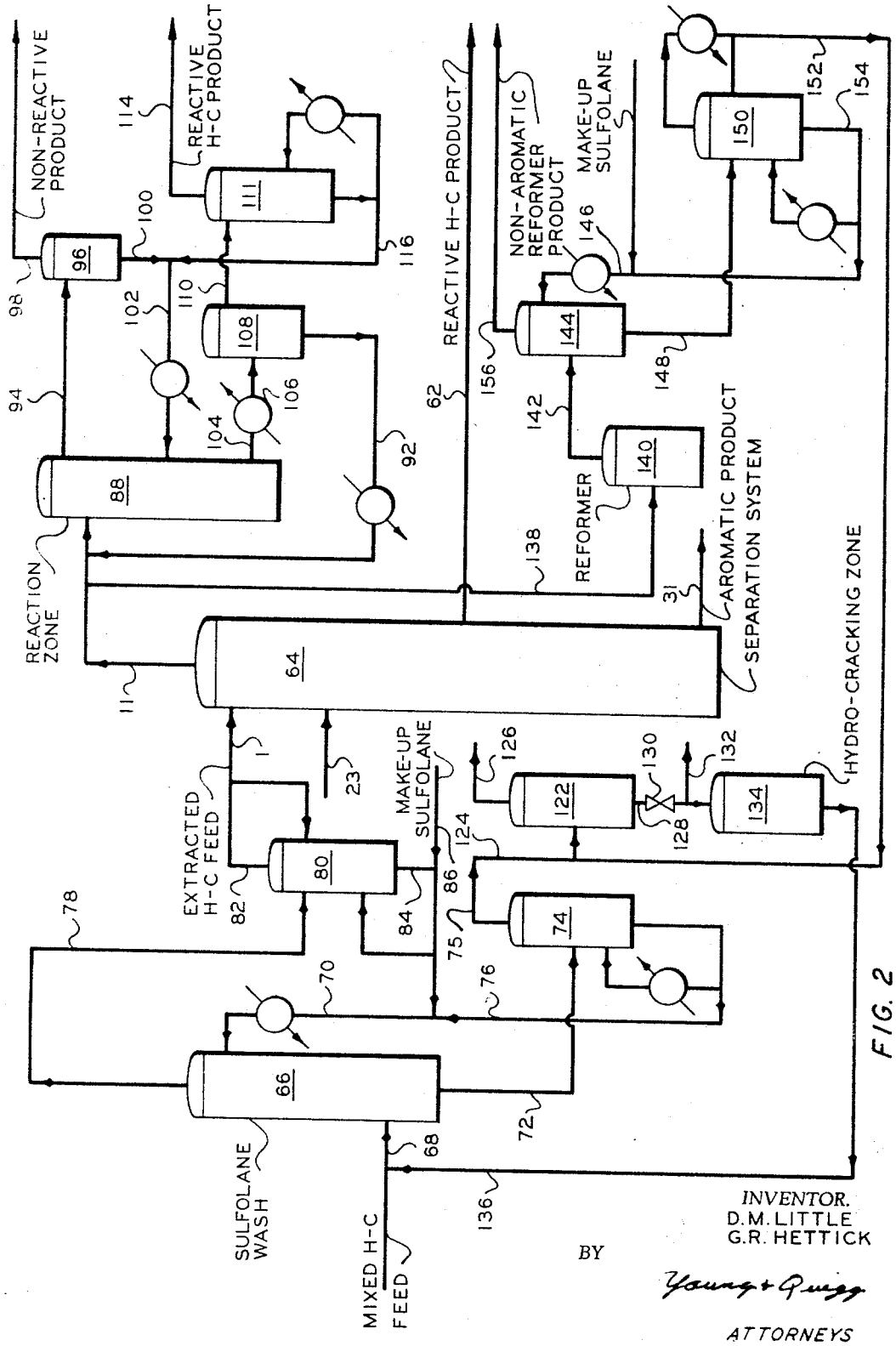
FIGURE 2 is a schematic representation of an alternate embodiment of the invention.

Referring now to FIGURE 2, the entire first hydrocarbon separation system of FIGURE 1 is represented by reference character 64. Mixed hydrocarbon feed containing normal paraffinics, isoparaffinics, naphthenics, and aromatics is introduced into prewash column 66 via conduit 68 (in this illustration, the sulfolane has a higher boiling point than the hydrocarbon). Sulfolane is introduced into the top of column 66 via conduit 70 to serve as the aromatics extraction or wash medium. Sulfolane rich in aromatics is withdrawn from column 66 via conduit 72 and introduced into stripper column 74. Aromatic product is recovered as overhead via conduit 75 (in the case of very high boiling aromatics the aromatic is recovered as bottoms product). Sulfolane is recovered as bottoms product and removed via conduit 76 which connects with conduit 70. Mixed hydrocarbon now essentially free of aromatics is withdrawn as overhead from column 66 via conduit 78 and introduced into stripper column 80 for removal of entrained sulfolane compound. Mixed hydrocarbon raffinate is withdrawn as overhead from column 80 via conduit 82 (or in the case of high boiling hydrocarbons it is withdrawn as bottoms product). This stream is charged to zone 64 via conduit 1. Sulfolane is withdrawn from stripper column 80 via conduit 84 and reintroduced into column 66 via line 70. Makeup sulfolane is introduced into the system via conduit 86.

Conduit 11 passes the unreacted hydrocarbon product to a post-purification system essentially identical to the first hydrocarbon separation system. The first element in this system is second reaction vessel 88 into which the nonreactive hydrocarbon product is introduced via conduit 11. An amide capable of selectively forming adducts with either straight chain or branched chain hydrocarbons carried by sulfolane stream is added to the feed to the second reaction vessel via conduit 92 which combines with conduit 11. As in the first reaction vessel the reactants stratify into an intermediate mixing zone, a layer of unreacted hydrocarbons in an upper zone and a lower zone which is comprised essentially of a slurry of hydrocarbon adduct crystals in the sulfolane compound. The nonreactive hydrocarbon phase is withdrawn from reaction vessel 88 via conduit 94 and introduced into a stripper 96 which serves to separate the nonreactive hydrocarbon from any sulfolane compound which may be entrained therein. The nonreactive hydrocarbon product is removed from stripper 96 via conduit 98. Sulfolane compound is withdrawn from stripper 96 as bottoms product via conduit 100 (or in the case of high boiling hydrocarbons the sulfolane compound is withdrawn as overhead and the nonreactive hydrocarbon product withdrawn as bottoms product). Conduit 100 intersects conduit 102 which returns the sulfolane compound (chilled by chiller means) to reactor 88. The slurry of hydrocarbon adduct crystals in the sulfolane compound is withdrawn from the lower portion of second reaction vessel 88 via conduit 104 and passed through heating section 106 at which point the adduct is thermally decomposed and the product separated in second decanter 108. The released hydrocarbon, being insoluble in sulfolane, forms an upper phase in decanter 108 which is withdrawn via conduit 110. The amide released on decomposition of the hydrocarbon adduct dissolves in the sulfolane compound which forms the lower phase. This sulfolane amide solution is withdrawn by conduit 92 and cooled to at least below the decomposition point of the adduct. The reactive (in the second reaction) hydrocarbon carried by conduit 110 is introduced into the stripper 111 where the reactive hydrocarbon is recovered as product via conduit 114 and any entrained sulfolane is separated, withdrawn via conduit 116, and returned to the second reaction vessel via conduit 102 (with heavier hydrocarbons the hydrocarbon would be recovered as bottoms product and the sulfolane recovered as overhead). While this second hydrocarbon system is similar to the first system designated by reference character 64, so far as apparatus is concerned, the combination of two such systems in series allows certain unique and highly desirable separations to be effected. For instance when the initial feed stream comprises isoparaffins, normal paraffins and cycloalkanes, such as cyclohexane, the mixed feed can be treated with urea in sulfolane in the first hydrocarbon separation system to yield a nonreactive product comprising cycloalkanes such as cyclohexane and isoparaffins, for instance, heptane isomers which are higher in molecular weight than the cyclohexane (but which boil at about the same temperature as cyclohexane). This nonreactive product from the first hydrocarbon separation system 64 can then be introduced into reaction zone 88 and treated with thiourea in sulfolane to leave as the sole nonreactive product the cycloalkanes. It is to be noted that under certain conditions, cycloalkanes, such as cyclohexane, will form adducts with thiourea. However, where there is a mixture of materials such as cyclohexane and higher molecular weight branched chain hydrocarbons, such as isomeric heptanes, the heptane isomers will be adducted preferentially to cyclohexane. By using a slight excess of the amide exceptionally pure cyclohexane can be produced with only a minor amount of cyclohexane being carried down with the reactive hydrocarbon stream. In refining operations wherein cyclohexane is recovered as a high purity product (e.g., for benzene manufacture, or for use in nylon manufacture) usually 2,2- and 2,4-dimethyl pentanes are present (although in small amounts) as the isomeric heptane impurity which cannot be separated from cyclohexane in an economical way using fractionation due to very close boiling points.

Also in systems not containing the cycloalkanes it is possible to use this procedure to obtain especially pure nonreactive product (by nonreactive is meant the nonreactive product of the first hydrocarbon separation system 64) by utilizing thiourea in sulfolane in the second hydrocarbon separation system where urea in sulfolane was utilized in the first or by utilizing the urea in sulfolane in the second hydrocarbon separation system where thioruea in sulfolane reagent was utilized in the first. In such instances the nonreactive product of the second hydrocarbon separation system will comprise only that small portion of reactive material carried over with the nonreactive product from the first system.

The final product of the second hydrocarbon separation system having been separated as a nonreactive product and subsequently as a reactive product has an exceptionally high purity.

It is also within the scope of the invention to treat the feed material with the same adduct-forming compound in both the first and second hydrocarbon separation zones. For instance, urea in sulfolane reagent can be used to adduct the straight chain hydrocarbons in reaction vessel 2 and subsequently urea in sulfolane can again be utilized in reaction vessel 88 to adduct any small amount of straight chain material which has been carried over from the first separation system leaving branched chained nonreactive product of exceptionally high purity.

In another alternate embodiment of this invention aromatic product (illustrated with the hydrocarbon having a lower boiling point than sulfolane) carried by line 75 is introduced into a fractionator 122 by means of conduit 124. In fractionator 122 the lighter aromatics, for instance having eleven carbon atoms per molecule or less, are removed via conduit 126 while the heavier aromatics, for instance having twelve or more carbons, are removed as bottoms product via conduit 128. Valve 130 in conduit 128 allows the heavier aromatics to be recovered as product via line 132 or introduced into hydrocracking unit 134 where said heavier aromatics are cracked to hydrocarbons having eleven carbon atoms or less per molecule and reintroduced into feed line 68 via conduit 136.

In still another alternate embodiment of this invention, nonreactive branched chain product, e.g., having eleven carbons or less, can be separated from the product carried by conduit 11 by fractionation, not shown, and withdrawn via conduit 138 and passed to reformer 140, e.g., to a Platformer, Houdriformer, Powerformer, or the like. The effluent from reformer 140 is passed via conduit 142 to sulfolane wash or extraction column 144. Sulfolane is introduced into the top of column 144 via line 146 so as to extract aromatic material from the effluent of reformer 140. Aromatics-rich sulfolane is withdrawn from the bottom of column 144 via line 148 and passed to stripper column 150 where the aromatic product is separated and withdrawn via conduit 152 which is combined with conduit 124. The sulfolane is recovered as bottoms product via line 154 and returned to column 144 via line 146. The nonaromatic product of reformer 140 is withdrawn from column 144 via line 156. It is apparent that the overhead products from columns 114 and 150 may be taken off as bottoms product depending on the relative boiling points of the materials.

The drawings do not include conventional equipment such as temperature and pressure controllers and the like, but the inclusion of such equipment is understood by those skilled in the art and is within the scope of the invention.

Example I

A fresh feed comprising 20 volume percent n-paraffin, 20 volume percent branched chain paraffins and 60 percent naphthenics (i.e., cycloparaffins) is introduced into a baffled reaction vessel similar to that shown in FIGURE 1, together with a slurry of urea in sulfolane, said slurry comprised of 13 weight percent urea. The feed is introduced at a rate of 5,000 barrels per day, the sulfolane-urea slurry at a rate of 15,000 barrels per day. The hydrocarbons of the feed are in the range of 17 to 20 carbon atoms per molecule. The reactor is operated at 5 p.s.i.g. and at a temperature of 100° F. Unreacted hydrocarbons are withdrawn from the top of the reactor and fed to a fractionation column to remove any sulfolane. The sulfolane is then returned to the reactor and the product, consisting essentially of branched chain hydrocarbons and naphthenic hydrocarbons, is recovered at a rate of 4,000 barrels per day. A lower phase of sulfolane and adduct crystals forms in the bottom of the reaction vessel and is conducted to a decomposition and phase separation zone where the mixture is heated to 200° F. to decompose the adduct. The pressure is maintained at 10 p.s.i.g. Two phases are formed in this zone, a lower sulfolane solution phase and an upper phase of the released hydrocarbon. The sulfolane phase is removed, chilled to precipitate the urea and the resulting slurry is reintroduced into the reactor. The hydrocarbon phase is withdrawn from the top of the phase separation and fed to a fractionation column to remove any sulfolane. This column is maintained at a pressure of 10 p.s.i.a.; the top temperature is 500° F. and the bottom temperature is 550° F. The sulfolane is returned to the reactor and the product, consisting of about 98 volume percent straight chain hydrocarbon, is recovered at a rate of 1,000 barrels per day.

Example II

A fresh feed comprising 20 volume percent n-paraffins, 20 volume percent branched chain paraffins and 60 percent naphthenics (i.e., cycloparaffins) was introduced into a vessel, together with a slurry of urea in sulfolane, said slurry comprised of 13 weight percent urea. In the batch process, 100 grams of feed were used and 13 grams of sulfolane-urea slurry were used. The hydrocarbons of the feed were in the range of 17 to 20 carbon atoms per molecule. The reaction was operated at atmospheric pressure and at a temperature of 100° F., for 60 minutes. Unreacted (nonnormal paraffinic) hydrocarbons were withdrawn from the top of the vessel and fed to a fractionation column to remove any sulfolane. The product, consisting essentially of branched chain hydrocarbons and naphthenic hydrocarbons, amounted to 80 grams. A lower phase of sulfolane and adduct crystals formed in the bottom of the reaction vessel and was conducted to a decomposition and phase separation zone where the mixture was heated to 160° F. to decompose the adduct. Two phases were formed in this zone, a lower sulfolane solution phase and an upper phase of the released normal paraffinic hydrocarbon. The sulfolane phase was removed, chilled to precipitate the urea and the resulting slurry was reintroduced into the vessel. The hydrocarbon phase was withdrawn from the top of the phase separation and fed to a fractionation column to remove any sulfolane. This column was maintained at atmospheric pressure; the top temperature was 500° F. and the bottom temperature was 525° F. The sulfolane was returned to the vessel and the product, consisting of about 73 volume percent straight chain hydrocarbon, was recovered.

While this invention has been described and exemplified in detail for the purpose of illustration, it is not to be construed as limited to the particular forms disclosed herein, but is intended to cover all modifications within the spirit and scope of the invention.

We claim:
1. A method for separating a mixture of hydrocarbon compounds, having from 6 to 50 carbon atoms per molecule, wherein at least one of said compounds is reactive with an amide selected from the group consisting of urea and thiourea to form a solid adduct therewith, which comprises introducing said mixture, said amide, and a sulfolane compound into a reaction zone; admixing the contents of said reaction zone at a temperature below the decomposition temperature of said adduct to form said adduct; withdrawing unreacted hydrocarbon from the top of said reaction zone, withdrawing a slurry of said adduct in said sulfolane compound from the bottom of said reaction zone; passing said slurry to a decomposition and phase separation zone maintained at a temperature above the decomposition temperature of said adduct; decomposing said adduct in said decomposition and phase separation zone to form a reactive hydrocarbon phase and a sulfolane compound phase, comprising the sulfolane compound in which the amide has dissolved; withdrawing said reactive hydrocarbon phase; withdrawing and cooling said sulfolane compound phase and returning said sulfolane compound and said amide to the reaction zone.

2. The method according to claim 1 wherein the amide is urea, the reactive hydrocarbon is a straight chain hydrocarbon of from 17 to 20 carbon atoms per molecule, and the sulfolane compound is sulfolane.

3. The method according to claim 1 wherein the amide is thiourea, the reactive hydrocarbon is a branched chain hydrocarbon of from 17 to 20 carbon atoms, and the sulfolane compound is sulfolane.

4. The method according to claim 1 wherein a light hydrocarbon wash is introduced into the reaction zone at a point near the bottom thereof.

5. The method according to claim 1 wherein the withdrawn sulfolane compound solution is cooled sufficiently to precipitate the amide.

6. The method according to claim 1 wherein the withdrawn sulfolane compound solution is cooled below the decomposition temperature of the adduct while maintaining the amide in solution in said sulfolane compound so that the amide crystallizes out on being reintroduced into the reaction zone, and wherein the contents of the reaction zone are agitated.

7. The method according to claim 1 wherein said feed comprises branched heptanes and cyclohexane, said amide is thiourea, and said cyclohexane is recovered as nonreactive product.

8. The method according to claim 1 wherein said mixture of hydrocarbon compounds is subjected to a sulfolane wash to remove aromatics prior to the introduction of said mixture of hydrocarbon compounds into said reaction zone, said aromatics being recovered as a first aromatic product.

9. The method according to claim 1 wherein said amide is urea, said method comprising in addition: passing said unreacted hydrocarbon into a second reaction zone; passing thiourea and a sulfolane compound into said second reaction zone; admixing the contents of said second reaction zone at a temperature below the decomposition temperature of said adduct to form said adduct; withdrawing unreacted hydrocarbon from the top of said second reaction zone; withdrawing a slurry of said adduct in said sulfolane compound from the bottom of said second reaction zone; passing said slurry to a second decomposition and phase separation zone maintained at a temperature above the decomposition temperature of said adduct; decomposing said adduct in said decomposition and phase separation zone to form a reactive hydrocarbon phase and a sulfolane compound phase, comprising the sulfolane compound in which the thiourea has dissolved; withdrawing said reactive hydrocarbon phase; withdrawing and cooling said sulfolane compound phase and returning said sulfolane compound phase and said thiourea to the reaction zone.

10. The method according to claim 1 wherein said amide is thiourea, said method comprising in addition: passing said unreacted hydrocarbon into a second reaction zone; passing urea and a sulfolane compound into said second reaction zone; admixing the contents of said second reaction zone at a temperature below the decomposition temperature of said adduct to form said adduct; withdrawing unreacted hydrocarbon from the top of said second reaction zone, withdrawing a slurry of said adduct in said sulfolane compound from the bottom of said second reaction zone; passing said slurry to a second decomposition and phase separation zone maintained at a temperature above the decomposition temperature of said adduct; decomposing said adduct in said decomposition and phase separation zone to form a reactive hydrocarbon phase and a sulfolane compound phase, comprising the sulfolane compound in which the urea has dissolved; withdrawing said reactive hydrocarbon phase; withdrawing and cooling said sulfolane compound phase and returning said sulfolane compound phase and said urea to the reaction zone.

11. The method according to claim 1 wherein said amide is urea, said method comprising in addition: passing said unreacted hydrocarbon into a second reaction zone; passing urea and a sulfolane compound into said second reaction zone; admixing the contents of said second reaction zone at a temperature below the decomposition temperature of said adduct to form said adduct; withdrawing unreacted hydrocarbon from the top of said second reaction zone; withdrawing a slurry of said adduct in said sulfolane compound from the bottom of said second reaction zone; passing said slurry to a second decomposition and phase separation zone maintained at a temperature above the decomposition temperature of said adduct; decomposing said adduct in said decomposition and phase separation zone to form a reactive hydrocarbon phase and a sulfolane compound phase, comprising the sulfolane compound in which the urea has dissolved; withdrawing said reactive hydrocarbon phase; withdrawing and cooling said sulfolane compound phase and returning said sulfolane compound phase and said urea to the reaction zone.

12. The method according to claim 1 wherein said amide is thiourea, said method comprising in addition: passing said unreacted hydrocarbon into a second reaction zone; passing thiourea and a sulfolane compound into said second reaction zone; admixing the contents of said second reaction zone at a temperature below the decomposition of said adduct to form said adduct; withdrawing unreacted hydrocarbon from the top of said second reaction zone, withdrawing a slurry of said adduct in said sulfolane compound from the bottom of said second reaction zone; passing said slurry to a second decomposition and phase separation zone maintained at a temperature above the decomposition temperature of said adduct; decomposing said adduct in said decomposition and phase separation zone to form a reactive hydrocarbon phase and a sulfolane compound phase, comprising the sulfolane compound in which the thiourea has dissolved; withdrawing said reactive hydrocarbon phase; withdrawing and cooling said sulfolane compound phase and returning said sulfolane compound phase and said thiourea to the reaction zone.

13. The method according to claim 1 wherein the mixture of hydrocarbon compounds contains aromatics, at least a portion of the sulfolane compound plus amide from the decomposition and phase separation zone is passed through a separation means whereby aromatic compounds are separated from the sulfolane, the aromatic compounds are recovered as product, and the sulfolane compound plus amide is returned to the reaction zone.

14. The method according to claim 13 wherein said feed comprises branched heptanes and cyclohexane, said amide is thiourea, and said cyclohexane is recovered as nonreactive product.

15. The method according to claim 8 wherein said reactive hydrocarbon from said decomposition and phase separation zone is subjected to a sulfolane wash to remove aromatic constituents, said removed aromatics forming a second aromatic product.

16. The method according to claim 15 comprising in addition: passing at least a portion of said withdrawn unreacted hydrocarbon to a reformer to convert said unreacted hydrocarbon to aromatics; collecting the aromatics thus formed as a third aromatic product and combining said third aromatic product with said first aromatic product; introducing the combined aromatic products stream into a fractionator and recovering a light fraction as product and a heavy fraction product; passing said heavy fraction to a hydrocracking zone wherein said heavy fraction is hydrocracked; recovering a product from said hydrocracking zone; and combining said product from said hydrocracking zone with said mixture of hydrocarbons prior to said sulfolane wash.

17. A method for separating a mixture of hydrocarbon compounds having from 6 to 50 carbon atoms per molecule, wherein at least one of said compounds is reactive with ureal to form a solid adduct therewith, which comprises: introducing said mixture, said urea, and sulfolane into a reaction zone of a first separation system; admixing the contents of said reaction zone at a temperature below the decomposition temperature of said adduct to form said adduct; effecting phase separation of products of said reaction zone; withdrawing unreacted hydrocarbon phase as a product of the process; withdrawing a phase comprising a slurry of said adduct in said sulfolane; passing said slurry to a decomposition and phase separation zone maintained at a temperature above the decomposition temperature of said adduct; decomposing said adduct in said decomposition and phase separation zone to form a reactive hydrocarbon phase and a sulfolane phase, comprising sulfolane in which said urea has dissolved; withdrawing said reactive hydrocarbon phase as a product of the process; withdrawing and cooling said sulfolane phase; returning said sulfolane and said urea to said reaction zone; passing product from said first separation system into a reaction zone of a second separation system in series with said first separation system; passing urea and sulfolane into said reaction zone of said second system; admixing the contents of said reaction zone of said second system at a temperature below the decomposition temperature of said adduct to form said adduct; effecting phase separation of products of said reaction zone of said second system; withdrawing unreacted hydrocarbon phase; withdrawing a phase comprising a slurry of said adduct in said sulfolane; passing said slurry to a decomposition and phase separation zone of said second system maintained at a temperature above the decomposition temperature of said adduct; decomposing said adduct in said decomposition and phase separation zone to form a reactive hydrocarbon phase and a sulfolane phase, comprising said sulfolane in which said urear has dissolved; withdrawing said reactive hydrocarbon phase; withdrawing and cooling said sulfolane phase and returning said sulfolane phase and said urea to said reaction zone of said second system.

References Cited

UNITED STATES PATENTS

| | | | |
|---|---|---|---|
| 2,520,715 | 8/1950 | Fetterly | 260—676 |
| 2,911,350 | 11/1959 | Kerns | 208—25 |
| 2,914,455 | 11/1959 | Keller | 208—25 |
| 2,917,447 | 12/1959 | Hoppe et al. | 208—25 |
| 3,231,489 | 1/1966 | Mahar | 208—25 |

HERBERT LEVINE, *Primary Examiner.*

U.S. Cl. X.R.

208—25; 260—96.5, 676